United States Patent
Kyuuma et al.

(10) Patent No.: US 6,647,948 B2
(45) Date of Patent: Nov. 18, 2003

(54) FUEL INJECTION CONTROL APPARATUS AND FUEL INJECTION CONTROL METHOD FOR DIRECT INJECTION ENGINE

(75) Inventors: Takahide Kyuuma, Toyota (JP); Noboru Takagi, Toyota (JP); Osamu Hosokawa, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 73 days.

(21) Appl. No.: 09/978,092

(22) Filed: Oct. 17, 2001

(65) Prior Publication Data

US 2002/0046729 A1 Apr. 25, 2002

(30) Foreign Application Priority Data

Oct. 19, 2000 (JP) ........................................ 2000-319468

(51) Int. Cl.$^7$ .............................. F02B 17/00; F02B 5/00
(52) U.S. Cl. .................. 123/295; 123/305; 123/406.55; 123/339.24; 123/491
(58) Field of Search ..................... 123/339.24, 406.47, 123/406.53, 406.55, 295, 443, 491, 492, 493; 701/104, 105, 113

(56) References Cited

U.S. PATENT DOCUMENTS

| | | | | |
|---|---|---|---|---|
| 5,785,031 A | * | 7/1998 | Akimoto et al. | 123/295 |
| 5,797,367 A | * | 8/1998 | Iida et al. | 123/295 |
| 5,809,973 A | * | 9/1998 | Iida et al. | 123/491 |
| 6,340,014 B1 | * | 1/2002 | Tomita et al. | 123/295 |
| 6,347,612 B1 | * | 2/2002 | Nishimura | 123/295 |
| 6,374,798 B1 | * | 4/2002 | Nagai et al. | 123/295 |
| 6,386,173 B1 | * | 5/2002 | Yamamoto et al. | 123/295 |
| 6,397,817 B1 | * | 6/2002 | Yoshida et al. | 123/406.47 |

FOREIGN PATENT DOCUMENTS

| | | | |
|---|---|---|---|
| EP | 0 824 188 A2 | 2/1998 | |
| EP | 0 849 455 A2 | 6/1998 | |
| JP | 4-187841 | 7/1992 | |
| JP | 321747 | * 11/1992 | F02D/41/34 |
| JP | 10-030468 | 2/1998 | |
| JP | 145510 | * 5/2000 | F02D/41/06 |
| JP | 179433 | * 6/2000 | F02B/17/10 |
| JP | 2001-082216 | 3/2001 | F02D/41/06 |
| JP | 130015 | * 5/2002 | F02D/41/06 |

OTHER PUBLICATIONS

European Patent Office Communication dated May 8, 2003 with attached European search report.

* cited by examiner

Primary Examiner—Hieu T. Vo
Assistant Examiner—Hai Huynh
(74) Attorney, Agent, or Firm—Kenyon & Kenyon

(57) ABSTRACT

An engine has an injector, which directly injects fuel into a combustion chamber. When the coolant temperature during the cranking of the engine is low, an ECU controls the injector such that the engine is operated in a compression stroke injection mode. When the engine is operated in the compression stroke injection mode, the ECU controls the injector to advance the fuel injection timing in accordance with an increase of the coolant temperature. As a result, the engine reduces the amount of unburned discharge gas, provides improved ignition and combustion, and provides stable idling.

12 Claims, 5 Drawing Sheets

FUEL INJECTION CONTROL APPARATUS AND FUEL INJECTION CONTROL METHOD FOR DIRECT INJECTION ENGINE

BACKGROUND OF THE INVENTION

The present invention relates to a fuel injection control apparatus and a fuel injection control method for an internal combustion engine that directly inject fuel into a combustion chamber.

Japanese Unexamined Patent Publication No. 4-187841 discloses a direct injection internal combustion engine. In the prior art engine, fuel is directly injected into a combustion chamber. Then, a spark plug ignites a mixture of air and fuel formed in the combustion chamber. When the engine is cold, or when the engine is not warm, and the temperature inside the combustion chamber is low, the injected fuel resists vaporization. Thus, the amount of fuel that adheres to the inner wall of the combustion chamber increases. Therefore, the concentration of the air-fuel mixture about the spark plug is insufficient and the ignition and combustion are adversely affected. In the prior art engine, the amount of fuel injected during the compression stroke is increased when the engine is cold.

As described above, the amount of fuel that adheres to the inner wall of the combustion chamber increases when the engine is cold. This deteriorates the emission gas quality of the engine, that is, the amount of discharged unburned gas increases. To prevent the deterioration, fuel must be injected when the piston is relatively close to top dead center during the compression stroke. However, this causes unstable idling of the engine when the engine temperature increases.

BRIEF SUMMARY OF THE INVENTION

The objective of the present invention is to provide a fuel injection control apparatus and a fuel injection control method for direct injection engine that suppress the deterioration of emission gas quality when the engine is cold and permit stable idling.

To achieve the foregoing and other objectives and in accordance with the purpose of the present invention, a fuel injection control apparatus for an engine is provided. An injector of the engine directly injects fuel into a combustion chamber. The apparatus includes a controller for controlling the injector. When the engine is cold, the controller controls the injector in a first mode, in which the fuel is injected during the compression stroke of the engine. The controller controls the injector to advance the timing of the injection of the first mode in accordance with an increase of the engine temperature.

The present invention also provides a fuel injection control method for an engine. Fuel is directly injected into a combustion chamber of the engine. The method includes injecting fuel during the compression stroke of the engine when the engine is cold and advancing the fuel injection timing in accordance with an increase of the engine temperature when the injection is executed during the compression stroke.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
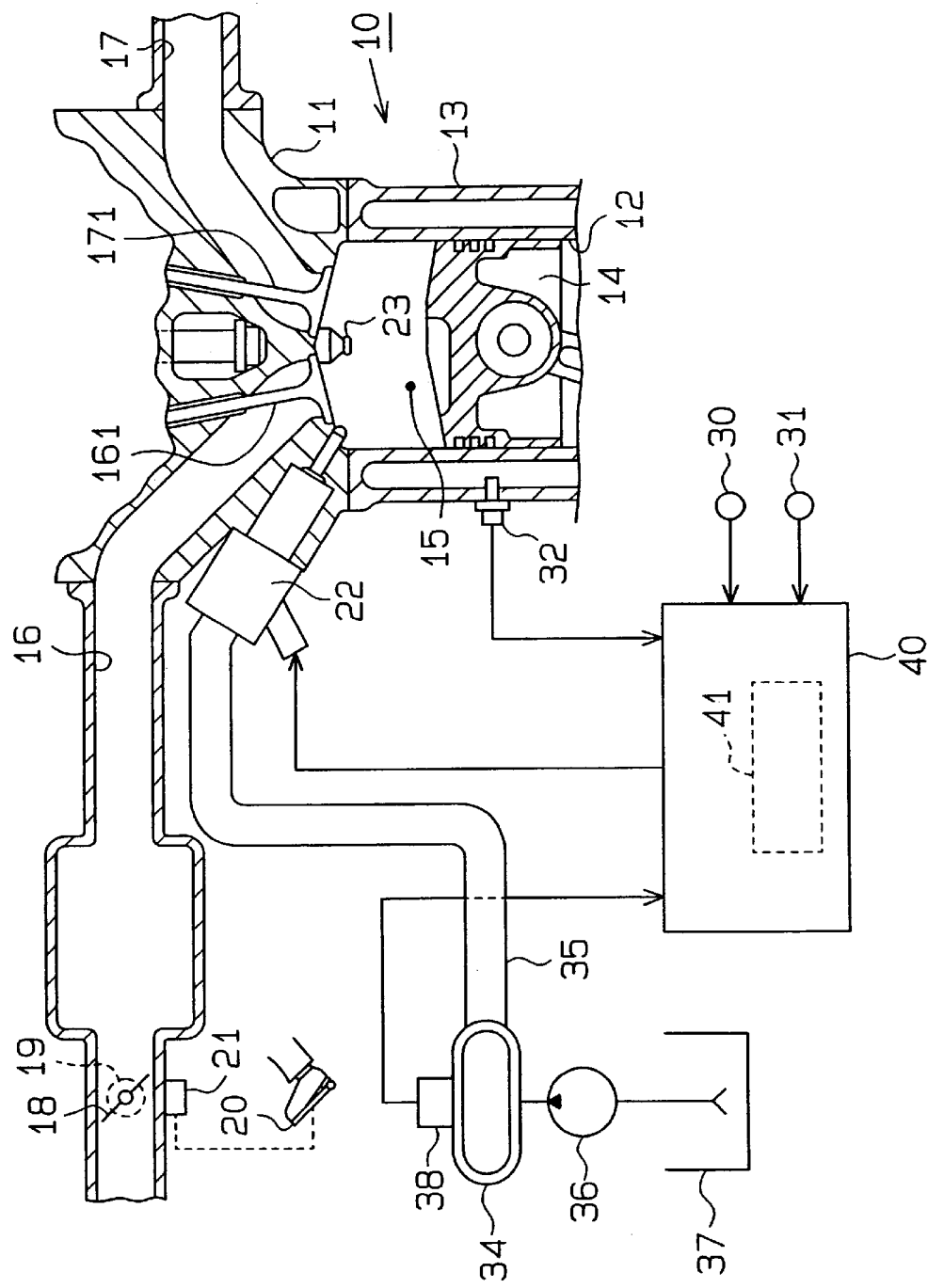
FIG. 1 is a schematic block diagram of a fuel injection control apparatus and an engine according to a first embodiment of the present invention.

A first embodiment of the present invention will now be described with reference to FIGS. 1 to 6. As shown in FIG. 1, an engine 10 includes a cylinder block 13, which has a plurality of cylinders 12 (only one cylinder is shown in FIG. 1), and a cylinder head 11, which is fastened above the cylinder block 13. A piston 14 is accommodated in each cylinder 12. A combustion chamber 15 is defined by each piston 14, the inner wall of the corresponding cylinder 12, and the cylinder head 11.

An intake passage 16 and a discharge passage 17 are connected to the combustion chambers 15. The intake passage 16 has a throttle valve 18 for adjusting the flow rate of intake air to the combustion chambers 15. The opening degree of the throttle valve 18 is adjusted by a throttle motor 19 based on the depression amount of an acceleration pedal 20. More specifically, the depression amount of the acceleration pedal 20 is detected by a pedal position sensor 21. Then, the opening degree of the throttle valve 18 is controlled by the throttle motor 19 based on the detected depression amount of the pedal 20. The opening degree of the throttle valve 18 is detected by a throttle position sensor (not shown). An intake temperature sensor (not shown) for detecting the temperature inside the intake passage 16 (intake temperature) is located upstream of the throttle valve 18. A catalytic device (not shown) for cleaning the emission gas is located inside the discharge passage 17.

Intake valves 161 are arranged in the cylinder head 11. Each intake valve 161 selectively connects and disconnects the corresponding combustion chamber 15 and the intake passage 16. Discharge valves 171 are arranged in the cylinder head 11. Each discharge valve 171 selectively connects and disconnects the corresponding combustion chamber 15 and the discharge passage 17.

A fuel injection valve 22 and a spark plug 23 are arranged in correspondence with each cylinder 12 in the cylinder head 11. Each fuel injection valve 22 directly injects fuel into the corresponding combustion chamber 15. Each spark plug 23 ignites the air-fuel mixture in the corresponding combustion chamber 15. The fuel injection valves 22 are connected to a delivery pipe 34. Each fuel injection valve 22 is connected to the delivery pipe 34 via a supply passage 35. The delivery pipe 34 is supplied with fuel from a fuel tank 37 through a fuel pump 36. Fuel is supplied to each fuel injection valve 22 through the corresponding supply passage 35 from the delivery pipe 34. The delivery pipe 34 is provided with a fuel pressure sensor 38 for detecting the fuel pressure in the pipe 34.

The engine 10 is provided with a crankshaft (not shown), which is an output axis, and at least one camshaft (not shown) for driving the intake valves 161 and the discharge valves 171. The camshaft rotates in accordance with the rotation of the crankshaft. A crank angle sensor 30 sends a predetermined pulse signal in accordance with the rotation of the crankshaft. A cam angle sensor 31 sends a predetermined pulse signal in accordance with the rotation of the camshaft. The cylinder block 13 is provided with a coolant temperature sensor 32 for detecting the temperature of the coolant (coolant temperature THW) in the engine 10.

Each sensor 21, 30, 31, 32, 38 sends a detection signal to an electronic control unit (ECU) 40 of the engine 10. The ECU 40 determines the running state of the engine 10 based on the received detection signals. The ECU 40 computes the rotational phase of the crankshaft (crank angle CA) and the rotational speed of the crankshaft (engine speed) based on signals from the crank angle sensor 30 and the cam angle sensor 31. The ECU 40 executes a fuel injection control process and an ignition control process in accordance with the running state of the engine 10. The ECU 40 is provided with a memory 41 for storing programs and data. The data may include a map used to perform the fuel injection control process and the ignition control process.

The ECU 40 switches the fuel injection mode in accordance with the running state of the engine 10. The fuel injection mode is switched to and from the intake stroke injection mode and the compression stroke injection mode. In the intake stroke injection mode, fuel is injected during the intake stroke of each piston 14. In the compression stroke injection mode, fuel is injected during the compression stroke of each piston 14.

When cranking the engine 10, the ECU 40 selects the intake stroke injection mode as the fuel injection mode. In this mode, each fuel injection valve 22 injects fuel during the intake stroke of the corresponding piston 14. When each piston 14 completes its intake stroke and reaches the top dead center of the compression stroke, the mixture of the injected fuel and air is ignited. Therefore, in the intake stroke injection mode, the time period taken to ignite the air-fuel mixture after the fuel is injected is relatively long. Thus, there is enough time for the injected fuel to vaporize in each combustion chamber 15. As a result, the air-fuel mixture is ignited and burned in a stable manner and the engine 10 is reliably started.

After the engine 10 is cranked, the ECU 40 determines whether the coolant temperature THW during cranking of the engine 10, or the coolant temperature during cranking THWST, is greater than or equal to a predetermined warming completion temperature (for example, 80 degrees Celsius). The coolant temperature THW reflects the temperature of the engine 10. If the coolant temperature during cranking THWST is less than the warming completion temperature, the ECU 40 determines that the engine 10 is not warm, or the engine 10 is cold. Then, the ECU 40 selects the fuel injection mode in accordance with the coolant temperature during cranking THWST. More specifically, if the coolant temperature during cranking THWST is less than the warming completion temperature and within a predetermined temperature range, the ECU 40 selects the compression stroke injection mode as the fuel injection mode. If the coolant temperature during cranking THWST is less than the warming completion temperature and out of the predetermined temperature range, the ECU 40 selects the intake stroke injection mode as the fuel injection mode.

Figure 3:
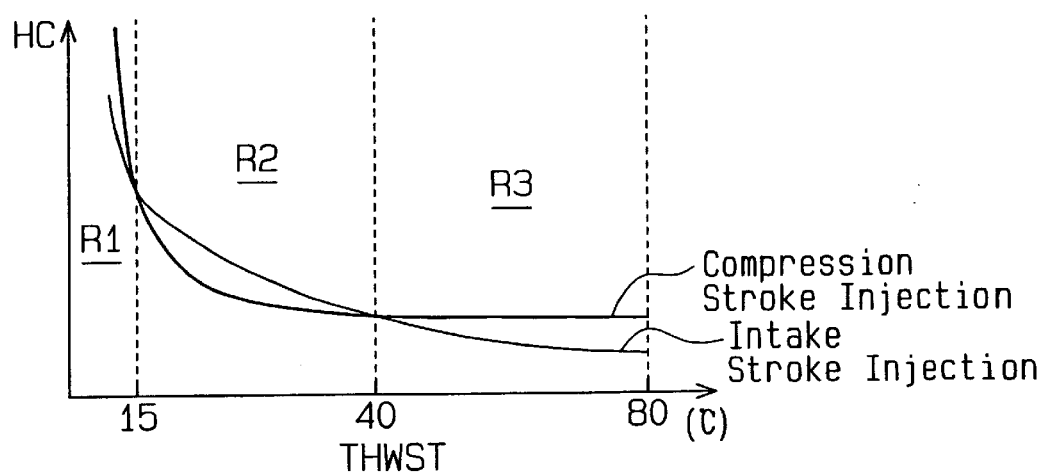
FIG. 3 is a graph illustrating the relationship between the coolant temperature during cranking THWST and the amount of unburned discharge gas (hydrocarbon) during the execution of each fuel injection mode.

For example, FIG. 3 shows the coolant temperature during cranking THWST when it is determined that the engine 10 is cold. The coolant temperature during cranking THWST is divided into a first temperature range R1, a second temperature range R2, and a third temperature range R3. The first temperature range R1 includes temperatures less than 15 degrees Celsius. The second temperature range R2 includes temperatures greater than or equal to 15 degrees Celsius and less than 40 degrees Celsius. The third temperature range R3 includes temperatures greater than or equal to 40 degrees Celsius and less than 80 degrees Celsius. In this case, 80 degrees Celsius is the warming completion temperature. When the coolant temperature during cranking THWST is within the second temperature range R2, the ECU 40 switches the fuel injection mode from the intake stroke injection mode to the compression stroke injection mode. When the coolant temperature during cranking THWST is within the first temperature range R1 or the third temperature range R3, the ECU 40 maintains the intake stroke injection mode as the injection fuel mode.

FIG. 3 shows a graph that illustrates the relationship between the coolant temperature during cranking THWST and the amount of unburned discharge gas (hydrocarbon (HC)) during the execution of each fuel injection mode. The graph indicates that when the coolant temperature during cranking THWST is within the second temperature range R2, the compression stroke injection mode provides less unburned discharge gas than the intake stroke injection mode. This is because the amount of injected fuel that adheres to the wall of each combustion chamber 15 is less in the compression stroke injection mode than in the intake stroke injection mode when the coolant temperature during cranking THWST is within the second temperature range R2. Thus, if the coolant temperature during cranking THWST is within the second temperature range R2 after the engine 10 is cranked in the intake stroke injection mode, the fuel injection mode is switched from the intake stroke injection mode to the compression stroke injection mode. This reduces the amount of unburned discharge gas.

If the coolant temperature during cranking THWST is within the third temperature range R3, the injected fuel hardly adheres to the wall of the combustion chambers 15 in both the intake stroke injection mode and the compression stroke injection mode. However, the time period taken to ignite the air-fuel mixture after fuel has been injected is longer in the intake stroke injection mode than in the compression stroke injection mode. Therefore, the injected fuel is more reliably vaporized in each combustion chamber 15 in the intake stroke injection mode. As shown in the graph of FIG. 3, if the coolant temperature-during cranking THWST is within the third temperature range R3, the amount of unburned discharge gas (HC) is less in the intake stroke injection mode than in the compression stroke injection mode. Thus, if the coolant temperature during cranking THWST is within the third temperature range R3 after the engine 10 is cranked in the intake stroke injection mode, the fuel injection mode is kept in the intake stroke injection mode. This reduces the amount of unburned discharge gas.

When the intake stroke injection mode or the compression stroke injection mode is executed while the engine 10 is cold, the ECU 40 determines the fuel injection amount such that the air-fuel ratio matches the theoretical, or stoichiometric, air-fuel ratio. The fuel injection amount is corrected in accordance with the running state of the engine 10, for example, the coolant temperature THW and the load applied to the engine 10.

The coolant temperature THW gradually increases during the compression stroke injection mode while the engine 10 is cold. When the coolant temperature THW reaches a predetermined threshold temperature THWC, the ECU 40 switches the fuel injection mode from the compression stroke injection mode to the intake stroke injection mode. A predetermined temperature a degrees Celsius is added to the coolant temperature during cranking THWST, and the resultant is referred to as the threshold temperature THWC. The predetermined temperature α Celsius is greater than zero, that is, for example, 10 degrees Celsius.

When the coolant temperature THW reaches the threshold temperature THWC during the running of the engine 10, the temperature of the wall of each combustion chamber 15 is higher than the threshold temperature THWC. In this state, fuel hardly adheres to the wall of each combustion chamber 15 in both the intake stroke injection mode and the compression stroke injection mode. However, the time period taken to ignite the air-fuel mixture after fuel is injected is shorter in the compression stroke injection mode than in the intake stroke injection mode. In other words, the time period taken to vaporize the injected fuel is shorter in the compression stroke injection mode than in the intake stroke injection mode. Thus, the amount of unburned discharge gas increases. Therefore, when the coolant temperature THW reaches the threshold temperature THWC, the fuel injection mode is switched from the compression stroke injection mode to the intake stroke injection mode.

During execution of the compression stroke injection mode when the engine 10 is cold, the ECU 40 advances the fuel injection timing in correspondence with the temperature increase of the engine 10. In this embodiment, the ECU 40 determines the temperature increase of the wall of each combustion chamber 15 in accordance with the decrease of the temperature difference ΔTHW between the threshold temperature THWC and the current coolant temperature THW. The temperature increase of the wall of each combustion chamber 15 is equivalent to the temperature increase of the engine 10. The ECU 40 refers to a map shown in FIG. 4 and determines the fuel injection timing in accordance with the temperature difference ΔTHW.

Figure 4:
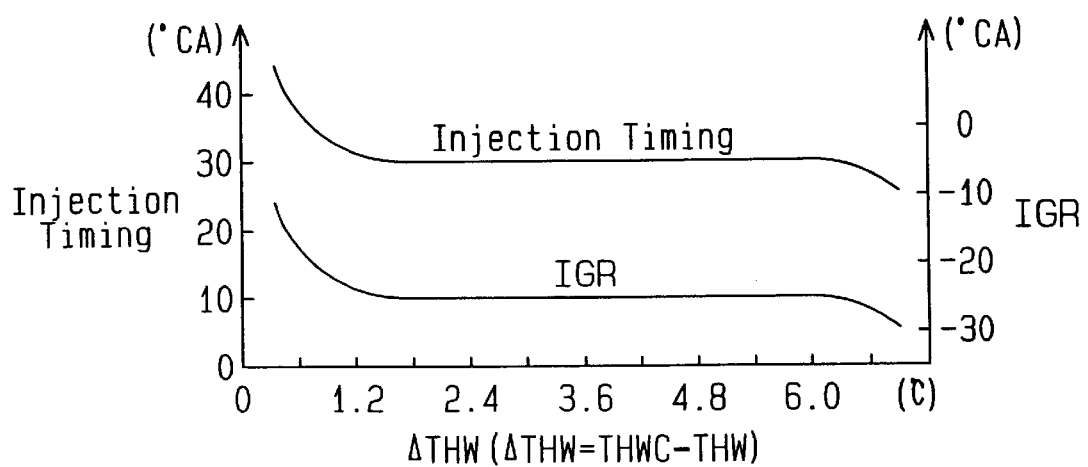
FIG. 4 is a map for determining the fuel injection timing and the ignition delay amount IGR during the execution of the compression stroke injection mode.

As shown in the map of FIG. 4, the fuel injection timing is advanced as the temperature difference ΔTHW decreases. In other words, the fuel injection timing is advanced as the coolant temperature THW increases towards the threshold temperature THWC. The fuel injection timing is represented by the rotational phase of the crankshaft, or the crank angle CA, of the engine 10. In the map of FIG. 4, the left vertical axis has units of degrees of crank angle CA. The crank angle CA represents the time period from when fuel is injected into each combustion chamber 15 to when the corresponding piston 14 is positioned at the top dead center of its compression stroke. In other words, the left vertical axis in the map of FIG. 4 shows the difference between the crank angle CA when fuel is injected into each combustion chamber 15 and the crank angle CA when the corresponding piston 14 is located at the top dead center of its compression stroke. Therefore, greater the crank angle CA of the vertical axis is, earlier the fuel injection timing is.

When the temperature of the engine 10 increases, the injected fuel is reliably vaporized and diffused. Thus, less injected fuel reaches the spark plug 23. On the other hand, the closer that the piston 14 is to the top dead center of the compression stroke, the higher the pressure in the combustion chamber 15 will be. Therefore, if the fuel injection timing is delayed, the fuel is injected when the pressure in the combustion chamber 15 is high. When the fuel is injected while the pressure in the combustion chamber 15 is relatively high, less injected fuel reaches the spark plug 23. Thus, if the temperature of the engine 10 increases when the fuel ignition timing is relatively delayed, the air-fuel mixture about the spark plug 23 is ignited in a lean state, which makes the combustion unstable.

However, as described in the preferred embodiment, the fuel injection timing is advanced in accordance with the temperature increase of the engine 10. This increases the difference between the pressure of the injected fuel and the pressure in the combustion chamber 15. Thus, the degree by which the pressure of the injected fuel is higher than the pressure in the combustion chamber 15 is increased. Therefore, even when the temperature of the engine 10 increases, the injected fuel reliably reaches the spark plug 23. Then, the air-fuel mixture about the spark plug 23 is ignited in a reach state. This allows a preferable ignition and combustion.

The catalytic device in the exhaust passage 17 provides a fully effective exhaust gas cleaning function only when it is warm. Therefore, during the execution of the compression stroke injection mode while the engine 10 is cold, the ECU 40 delays the ignition timing more than when the engine 10 is operated in a normal mode, or when the engine 10 is warm. This allows time to efficiently warm the catalytic device and to provide reliable combustion. More specifically, the ECU 40 determines a basic ignition timing in accordance with the running state of the engine 10, which is based on factors such as the engine speed and the engine load. The ECU 40 refers to the map of FIG. 4 and determines an ignition delay amount IGR in accordance with the temperature difference ΔTHW. Then, the ECU 40 sets the actual ignition timing. The actual ignition timing is the basic ignition timing delayed by the ignition delay amount IGR.

As shown in the map of FIG. 4, the ignition delay amount IGR decreases as the temperature difference ΔTHW decreases. In other words, the ignition delay amount IGR decreases as the coolant temperature THW increases towards the threshold temperature THWC. According to the map of FIG. 4, the right vertical axis has units of degrees of negative crank angle CA. The basic ignition timing is referred to as zero and the ignition delay amount IGR is represented by the negative crank angle CA. As the absolute value of the crank angle CA of the vertical axis decreases, the ignition delay amount IGR decreases. The delay of the actual ignition timing with respect to the basic ignition timing is reduced accordingly. As the temperature of the engine 10 increases the ignition delay amount IGR decreases. The ignition timing is advanced accordingly.

Figure 2A:
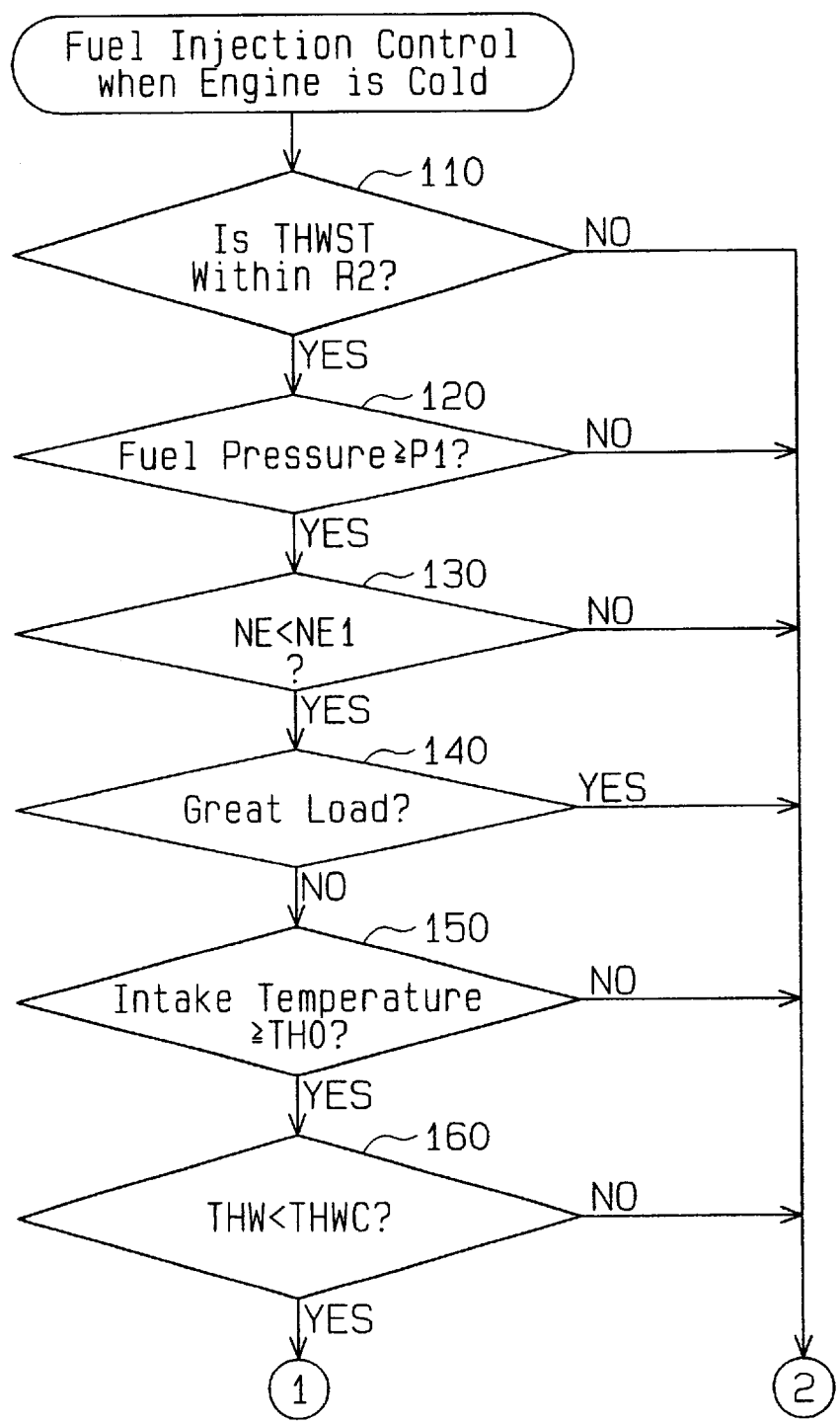
FIGS. 2(a) and 2(b) are flowcharts illustrating fuel injection control steps when the engine is cold.
Figure 2B:
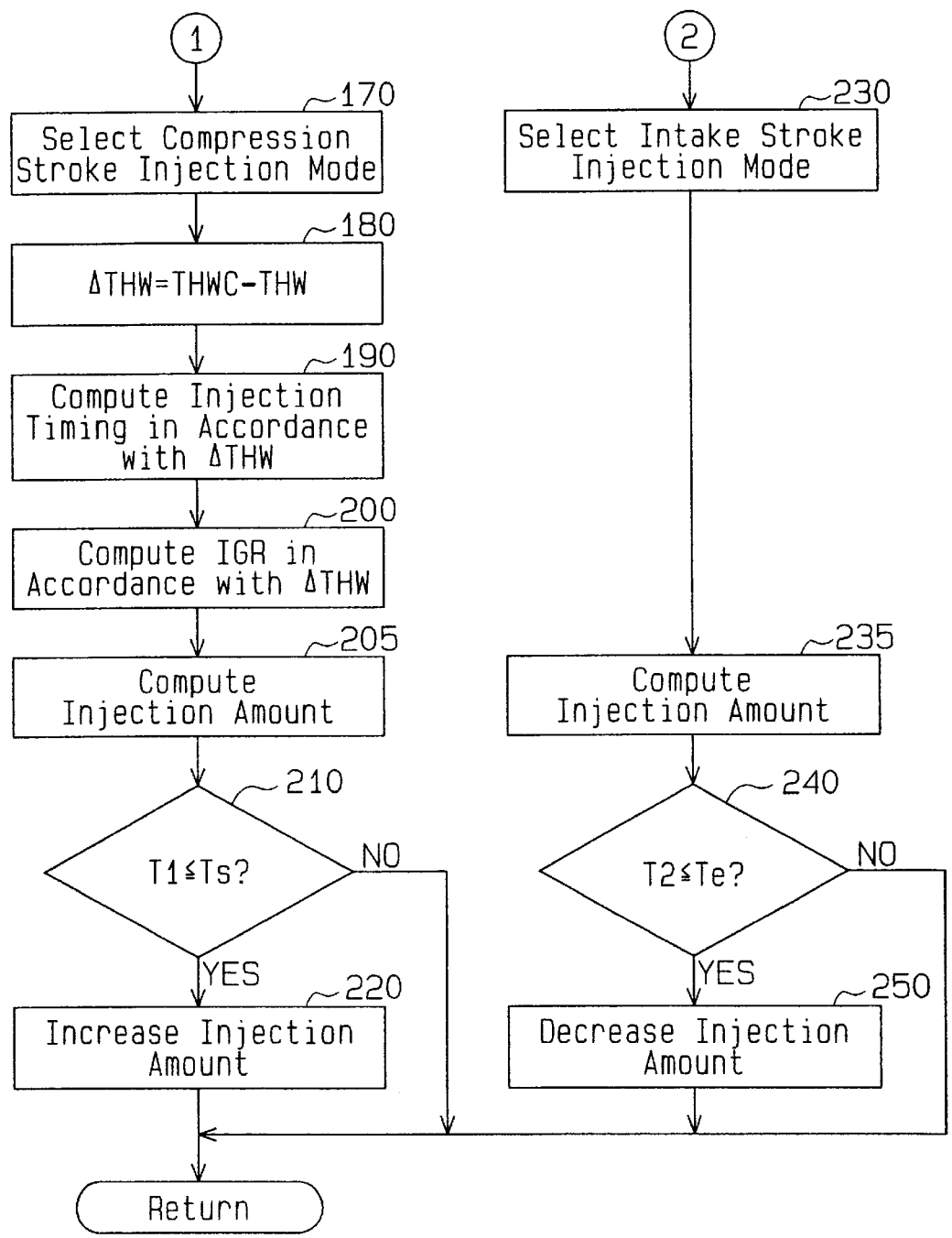

Fuel injection control steps are described with reference to the flowcharts of FIGS. 2(a) and 2(b). The fuel injection control steps are executed when the engine 10 is cranked while it is cold. The ECU 40 executes the routine of the flowcharts at predetermined crank angles.

When the engine 10 is cranked, the ECU 40 selects the intake stroke injection mode as the fuel injection mode. In this case, the coolant temperature THWST is less than the warming completion temperature, that is, 80 degrees Celsius. In step 110 of FIG. 2(a), the ECU 40 determines whether the coolant temperature during cranking THWST is within the second temperature range R2 shown in the graph of FIG. 3. If the coolant temperature during cranking THWST is not within the second temperature range R2, that is, when the coolant temperature during cranking THWST is within the first or third temperature range R1, R3, the ECU 40 proceeds to step 230 of FIG. 2(b). The ECU 40 then selects the intake stroke injection mode as the fuel injection mode. If the coolant temperature during cranking THWST is within the second temperature range R2, the ECU 40 proceeds to step 120 of FIG. 2(a).

In step 120, the ECU 40 determines whether the fuel pressure detected by the fuel pressure sensor 38 is greater than or equal to a predetermined pressure P1. The predetermined pressure P1 is the pressure required to execute the compression stroke injection mode. If the fuel pressure is less than the predetermined pressure P1, the compression stroke injection cannot be executed. Thus, the ECU 40 proceeds to step 230 of FIG. 2(b). If the fuel pressure is greater than or equal to the predetermined pressure P1, the compression stroke injection can be executed. Thus, the ECU 40 proceeds to step 130.

In step 130, the ECU 40 determines whether the engine speed NE is less than a predetermined speed NE1. The predetermined speed NE1 is the maximum value of the engine speed NE when the engine 10 is idling. When the engine speed NE is greater than or equal to the predetermined speed NE1, the time allowed for vaporizing the injected fuel is insufficient in the compression stroke injection mode. Therefore, the ECU 40 proceeds to step 230 of FIG. 2(b). When the engine speed NE is less than the predetermined speed NE1, the compression stroke injection can be executed. Thus, the ECU 40 proceeds to step 140.

In step 140, the ECU 40 determines whether the load applied to the engine 10 is great based on the depression amount of the acceleration pedal 20. When the load applied to the engine 10 is great, the fuel injection amount increases. Thus, the fuel concentration of the air-fuel mixture formed about the plug 23 becomes excessive in the compression stroke injection mode. Therefore, the ECU 40 proceeds to step 230 of FIG. 2(b) when the load applied to the engine 10 is great. When the load applied to the engine 10 is small, the compression stroke injection can be executed. Thus, the ECU 40 proceeds to step 150.

In step 150, the ECU 40 determines whether the temperature in the intake passage 16 (intake temperature) is greater than or equal to a predetermined temperature TH0. When the intake temperature is less than the predetermined temperature TH0, the amount of unburned discharge gas increases in the compression stroke injection mode. Thus, the ECU 40 proceeds to step 230 of FIG. 2(b). When the intake temperature is greater than or equal to the predetermined temperature TH0, the compression stroke injection can be executed. Thus, the ECU 40 proceeds to step 160.

In step 160, the ECU 40 determines whether the current coolant temperature THW is less than the threshold temperature THWC (THWC=THWST+α). If the current coolant temperature THW is greater than or equal to the threshold temperature THWC, the ECU 40 proceeds to step 230 of FIG. 2(b). If the current coolant temperature THW is less than the threshold temperature THWC, the ECU 40 proceeds to step 170 of FIG. 2(b).

In step 170, the ECU 40 selects the compression stroke injection mode as the fuel injection mode. In step 180, the ECU 40 computes the temperature difference ΔTHW between the threshold temperature THWC and the current coolant temperature THW. In step 190, the ECU 40 refers to the map of FIG. 4 and computes the fuel injection timing in accordance with the temperature difference ΔTHW. In step 200, the ECU 40 refers to the map of FIG. 4 and computes an ignition delay amount IGR in accordance with the temperature difference ΔTHW.

In step 205, the ECU 40 computes the fuel injection amount in accordance with, for example, the load applied to the engine 10 and the coolant temperature THW. In step 210, the ECU 40 determines whether the elapsed time period T1 from when the compression stroke injection mode started is less than or equal to a predetermined time period Ts. If the elapsed time period T1 is greater than the predetermined period length Ts, the ECU 40 temporarily terminates the routine of the process. Therefore, when the predetermined time period Ts has elapsed since the compression stroke injection mode was started, the amount of fuel obtained in step 205 is injected by the injection timing obtained in step 190.

In step 210, if it is determined that the elapsed time period T1 is less than or equal to the predetermined time period Ts, the ECU 40 proceeds to step 220. The ECU 40 then increases the fuel injection amount obtained in step 205 and temporarily terminates the routine of the process.

Figure 5:
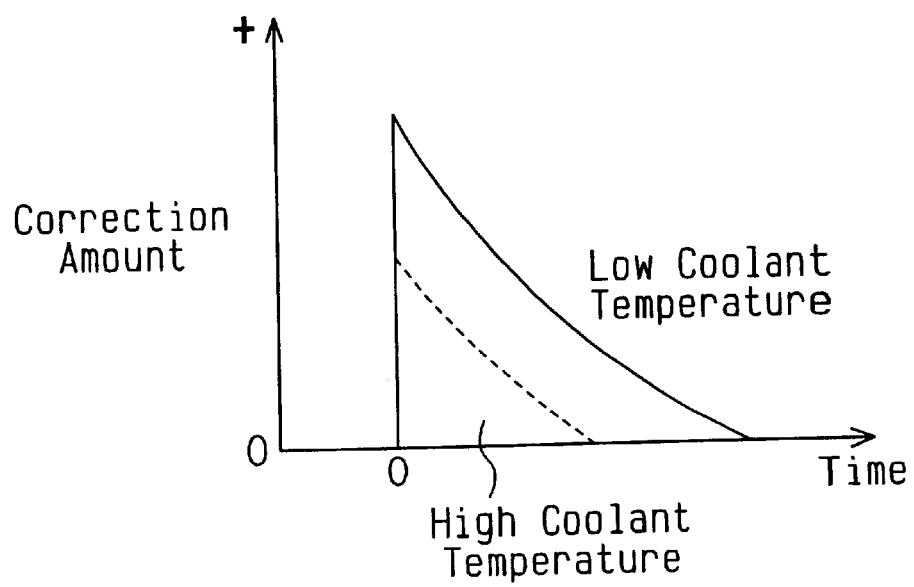
FIG. 5 is a map for determining a correction amount of the fuel injection amount immediately after switching to the compression stroke injection mode.

The ECU 40 determines the increase, or the correction amount, of the fuel injection amount in accordance with a map of FIG. 5. As shown in the map, the correction amount is reduced as the coolant temperature THW and the elapsed time period T1 increase. The ECU 40 adds the obtained correction amount to the fuel injection amount obtained in step 205, which is a normal amount of the fuel injection. Therefore, if the predetermined time period Ts has not elapsed since the compression stroke injection mode was started, the increased normal amount of fuel is injected at the injection timing obtained in step 190.

Immediately after the fuel injection mode is switched from the intake stroke injection mode to the compression stroke injection mode while the engine 10 is cold, the amount of fuel that adheres to the top of each piston 14 increases temporarily. Thus, the amount of fuel that contributes to the combustion decreases temporarily. This causes abrupt change in the torque of the engine 10 and applies a shock to the engine 10. However, according to the present invention, the fuel injection amount is increased immediately after the fuel injection mode is switched from the intake stroke injection mode to the compression stroke injection mode. Therefore, the torque of the engine 10 is smoothly changed and the shock applied to the engine 10 is reduced.

When the fuel injection mode is switched from the intake stroke injection mode to the compression stroke injection mode, the amount of fuel that adheres to the top of each piston 14 decreases as the coolant temperature THW, or the temperature of the engine 10, increases. The amount of fuel that adheres to the top of each piston 14 also decreases as the elapsed time period T1 from when the compression stroke injection mode started increases. Thus, the fuel injection amount is appropriately corrected by changing the amount of increase of the fuel injection amount in accordance with the coolant temperature THW and the elapsed time period T1.

The coolant temperature THW increases as the engine 10 runs in the compression stroke injection mode. When the coolant temperature THW is greater than or equal to the threshold temperature THWC, the determination in step 160 is negative. Thus, the ECU 40 proceeds to step 230 and the fuel injection mode is switched to the intake stroke injection mode.

In step 230, the intake stroke injection mode is selected as the fuel injection mode. The ECU 40 then proceeds to step 235. In step 235, the ECU 40 computes the fuel injection amount in accordance with, for example, the load applied to the engine 10 and the coolant temperature THW. In step 240, the ECU 40 determines whether the elapsed time period T2, which is measured from when the compression stroke injection mode was terminated, is less than or equal to a predetermined time period Te. If the elapsed time period T2 is greater than the predetermined time period Te, the ECU 40 temporarily terminates the routine of the process. Therefore, after the predetermined time period Te elapses from when the compression stroke injection mode is terminated, the amount of fuel obtained in step 235 is injected. The fuel injection timing during the execution of the intake stroke injection mode is computed by a calculation routine, which is not shown in the figures. If the compression stroke injection mode is not selected before selecting the intake stroke injection mode, the outcome in step 240 is negative.

When it is determined that the elapsed time period T2 is less than or equal to the predetermined time period Te in step 240, the ECU 40 proceeds to step 250. The ECU 40 then decreases the fuel injection amount obtained in step 235 and temporarily terminates the routine of the process.

Figure 6:
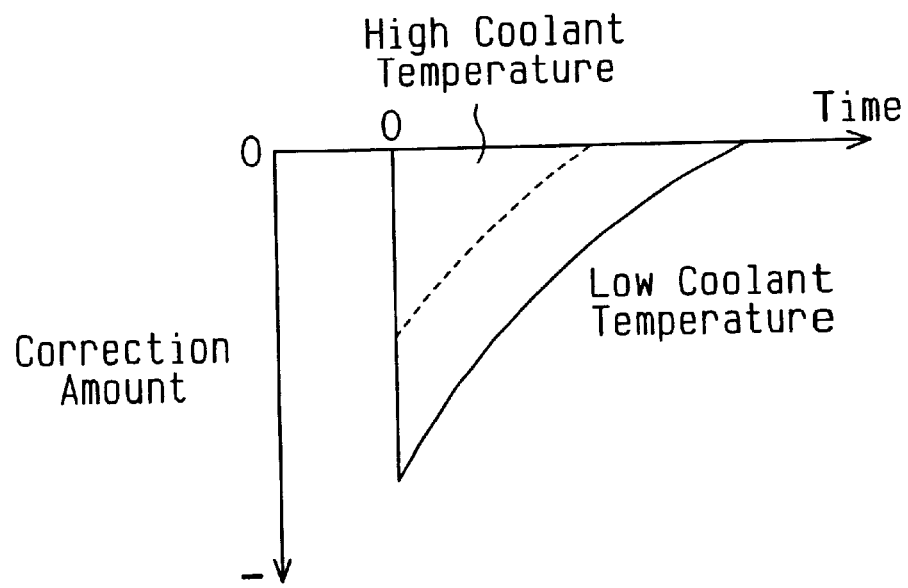
FIG. 6 is a map for determining a correction amount of the fuel injection amount immediately after switching to an intake stroke injection mode.

The ECU 40 determines the decrease amount, or the correction amount, of the fuel injection amount in accordance with a map shown in FIG. 6. As shown in the map, the correction amount is reduced as the coolant temperature THW and the elapsed time period T2 increases. The ECU 40 decreases the normal fuel injection amount obtained in step 235 by the correction amount. Therefore, if the predetermined time period Te has not elapsed from when the compression stroke injection mode was terminated, the decreased normal amount of fuel is injected.

Immediately after the fuel injection mode is switched from the compression stroke injection mode to the intake stroke injection mode while the engine 10 is cold, the amount of fuel that adheres to the top of each piston 14 decreases temporarily. Thus, the amount of fuel that contributes to the combustion increases temporarily. This causes abrupt change in the torque of the engine 10 and generates a shock to the engine 10. However, according to the present invention, the fuel injection amount is decreased immediately after the fuel injection mode is switched from the compression stroke injection mode to the intake stroke injection mode. Therefore, the torque of the engine 10 is smoothly changed and the shock applied to the engine 10 is reduced.

The fuel injection amount is appropriately corrected as when the fuel injection mode is switched from the intake stroke injection mode to the compression stroke injection mode. That is, the fuel injection amount is appropriately corrected by changing the amount by which the fuel injection amount is decreased in accordance with the coolant temperature THW and the elapsed time period T2.

The preferred embodiment provides the following advantages.

When the coolant temperature during cranking THWST of the engine 10 is within the predetermined temperature range (the second temperature range R2 of FIG. 3), the compression stroke injection mode is selected as the fuel injection mode. This reduces the amount of unburned discharge gas when the engine 10 is cold.

When executing the compression stroke injection mode while the engine 10 is cold, the fuel injection timing is advanced in accordance with the increase of the temperature of the engine 10. As a result, the engine 10 reduces the amount of unburned discharge gas, provides improved ignition and combustion, and provides stable idling.

When the coolant temperature THW reaches the predetermined threshold temperature THWC, or the sum of the coolant temperature during cranking THWST and the predetermined temperature α Celsius, the fuel injection mode is switched from the compression stroke injection mode to the intake stroke injection mode. The temperature of the wall of each combustion chamber 15, that is, the temperature increase of the engine 10, is appropriately determined based on the decrease of the temperature difference Δ THW between the threshold temperature THWC and the current coolant temperature THW. Therefore, the fuel injection timing is determined in accordance with the temperature increase of the engine 10 during execution of the compression stroke injection mode.

When executing the compression stroke injection mode while the engine 10 is cold, the ignition delay amount IGR is decreased in accordance with the temperature increase of the engine 10. As a result, the time period between the fuel injection and the ignition is appropriately determined.

This maintains the desired combustion and efficiently warms the catalytic device.

When the temperature inside the intake passage 16 (intake temperature) is less than the predetermined temperature TH0, the intake stroke injection mode is selected as the fuel injection mode regardless of the coolant temperature during cranking THWST. This reduces the amount of unburned discharge gas.

When the coolant temperature THW reaches the threshold temperature THWC, the fuel injection mode is switched from the compression stroke mode to the intake stroke injection mode. This reduces the amount of unburned discharge gas.

The fuel injection amount is temporarily increased or decreased until a predetermined time period elapses after the fuel injection mode is switched. This reduces the abruptness of the change in the torque of the engine 10 when switching the fuel injection modes. Thus, the shock applied to the engine 10 is reduced. The fuel injection amount is appropriately increased or decreased in accordance with the coolant temperature THW and the time elapsed since the injection mode was switched.

The preferred embodiment of the present invention may be changed as follows.

According to the embodiment described in FIGS. 1 to 6, the fuel injection timing is advanced in accordance with the decrease of the temperature difference ΔTHW between the threshold temperature THWC and the current coolant temperature THW. In addition, the fuel injection timing may be advanced in accordance with the increase of the temperature difference between the coolant temperature during cranking THWST and the current coolant temperature THW. Similarly, the ignition delay amount IGR may be changed in accordance with the temperature difference between the coolant temperature during cranking THWST and the current coolant temperature THW.

According to the embodiment described in FIGS. 1 to 6, the fuel injection mode is switched from the compression stroke injection mode to the intake stroke injection mode when the coolant temperature THW reaches the threshold temperature THWC. In this case, the threshold temperature THWC is the sum of the coolant temperature during cranking THWST and the predetermined temperature α degrees Celsius. In addition, the wall of each combustion chamber 15 may be detected directly. Then, if the temperature of each combustion chamber 15 reaches a predetermined temperature, the fuel injection mode may be switched from the compression stroke injection mode to the intake stroke injection mode.

Therefore, the present examples and embodiments are to be considered as illustrative and not restrictive and the invention is not to be limited to the details given herein, but may be modified within the scope and equivalence of the appended claims.

What is claimed is:

1. A fuel injection control apparatus for an engine, in which an injector directly injects fuel into a combustion chamber, the apparatus comprising a controller for controlling the injector, wherein, when the engine is cold, the controller controls the injector in a first mode, in which the fuel is injected during the compression stroke of the engine, wherein the controller controls the injector to advance the timing of the injection of the first mode in accordance with an increase of a coolant temperature of the engine, and wherein the controller determines the timing of the injection of the first mode according to the difference between a temperature that is determined based on the coolant temperature during cranking of the engine and a current coolant temperature.

2. The apparatus according to claim 1, wherein the controller determines that the engine is cold when the coolant temperature during cranking of the engine is less than a predetermined value.

3. The apparatus according to claim 2, wherein, when the coolant temperature reaches a threshold temperature, which is equivalent to the sum of the coolant temperature during cranking and a predetermined temperature, during the first mode of injection, the controller switches to a second mode, in which the injector injects fuel during the intake stroke of the engine.

4. The apparatus according to claim 3, wherein the controller determines the timing of the injection of the first mode according to the difference between the threshold temperature and the current coolant temperature.

5. The apparatus according to claim 4, wherein the controller advances the timing of the first mode injection as the difference between the threshold temperature and the current coolant temperature decreases.

6. The apparatus according to claim 1, further comprising a spark plug for igniting the fuel injected into the combustion chamber, wherein, when the first mode of injection is executed, the controller controls the spark plug to advance the timing of the ignition as the coolant temperature increases.

7. The apparatus according to claim 1, wherein the engine is operated in a fuel injection mode selected between the first mode and a second mode, in which the fuel is injected during the intake stroke of the engine, and wherein the controller controls the injector to temporarily decrease a fuel injection amount when the fuel injection mode is switched from the first mode to the second mode, and the controller controls the injector to temporarily increase fuel injection amount when the fuel injection mode is switched from the second mode to the first mode.

8. A fuel injection control apparatus for an engine, in which an injector directly injects fuel into a combustion chamber, wherein the engine is operated in a fuel injection mode selected between a first injection mode, in which the fuel is injected during the compression stroke, and a second injection mode, in which the fuel is injected during the intake stroke, the apparatus comprising:

a sensor for sensing a coolant temperature of the engine; and control means for controlling the injector such that the engine is operated in the first injection mode when the coolant temperature during the cranking of the engine is less than a predetermined value, wherein, when the engine is operated in the first injection mode, the control means controls the injector to advance the fuel injection timing in accordance with an increase of the coolant temperature, and further wherein when the engine is operated in the first injection mode, the control means advances the fuel injection timing as the difference between the threshold temperature and the current coolant temperature decreases, the threshold temperature being equivalent to the sum of the coolant temperature during cranking and a predetermined temperature.

9. The apparatus according to claim 8, wherein, when the coolant temperature reaches the threshold temperature, during operation of the engine in the first injection mode, the control means switches the fuel injection mode to the second injection mode.

10. The apparatus according to claim 8, further comprising a spark plug for igniting the fuel injected into the combustion chamber, wherein, when the engine is operated in the first injection mode, the control means controls the spark plug to advance the timing of the ignition as the coolant temperature increases.

11. The apparatus according to claim 8, wherein the control means controls the injector to temporarily decrease a fuel injection amount when the fuel injection mode is switched from the first injection mode to the second injection mode, and the control means controls the injector to temporarily increase a fuel injection amount when the fuel injection mode is switched from the second injection mode to the first injection mode.

12. A fuel injection control method for an engine, wherein fuel is directly injected into a combustion chamber, the method comprising:

injecting fuel during the compression stroke of the engine when the engine is cold; and advancing the fuel injection timing in accordance with an increase of a coolant temperature of the engine when the injection is executed during the compression stroke, wherein the fuel injection timing is determined in accordance with a difference between a temperature that is determined based on an engine coolant temperature during cranking of the engine and a current coolant temperature.

* * * * *